United States Patent
Vafin et al.

(10) Patent No.: US 9,246,644 B2
(45) Date of Patent: Jan. 26, 2016

(54) JITTER BUFFER

(71) Applicant: Microsoft Technology Licensing, LLC, Redmond, WA (US)

(72) Inventors: Renat Vafin, Tallinn (EE); Mattias Nilsson, Sundbyberg (SE); Soren Vang Andersen, Esch-sur-Alzette (LU); Andrei Jefremov, Jarfalla (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/589,948

(22) Filed: Jan. 5, 2015

(65) Prior Publication Data

US 2015/0110135 A1    Apr. 23, 2015

Related U.S. Application Data

(63) Continuation of application No. 13/594,668, filed on Aug. 24, 2012, now Pat. No. 8,948,214.

(30) Foreign Application Priority Data

Oct. 25, 2011    (GB) .................................. 1118392.8

(51) Int. Cl.
*H04L 1/20* (2006.01)
*H04J 3/06* (2006.01)
(Continued)

(52) U.S. Cl.
CPC . *H04L 1/205* (2013.01); *H04J 3/06* (2013.01); *H04L 1/00* (2013.01); *H04L 1/0018* (2013.01); *H04L 43/087* (2013.01); *H04L 65/80* (2013.01); *H04L 1/0009* (2013.01)

(58) Field of Classification Search
CPC ........................................................ H04J 3/06
See application file for complete search history.

(56) References Cited

U.S. PATENT DOCUMENTS 5,565,924 A  * 10/1996  Haskell et al. ............. 348/423.1
5,619,566 A    4/1997  Fogel
(Continued)

FOREIGN PATENT DOCUMENTS

CN         1541470       10/2004
CN       101507203        8/2009
(Continued)

OTHER PUBLICATIONS

"Combined Search & Examination Report", GB Application No. 1118408.2, Feb. 11, 2013, 16 pages.
(Continued)

*Primary Examiner* — Brian D Nguyen
*Assistant Examiner* — Toan Nguyen
(74) *Attorney, Agent, or Firm* — Danielle Johnston-Holmes; Micky Minhas

(57) ABSTRACT

Methods, transmitter, receiver and computer program product for transmitting or receiving data of a real-time communication event, the data being transmitted from the transmitter to a jitter buffer of the receiver. At least one processing parameter describing how data is to be processed for transmission from the transmitter to the jitter buffer in the real-time communication event is determined at the transmitter. Data is processed for transmission from the transmitter to the jitter buffer in accordance with the determined at least one processing parameter. Control information based on the determined at least one processing parameter is transmitted from the transmitter to the receiver, wherein the control information is for use by the receiver to control a state of the jitter buffer. The processed data is transmitted from the transmitter to the jitter buffer of the receiver in the real-time communication event.

20 Claims, 9 Drawing Sheets

(51) Int. Cl.
*H04L 1/00* (2006.01)
*H04L 29/06* (2006.01)
*H04L 12/26* (2006.01)

(56) References Cited

U.S. PATENT DOCUMENTS

| | | | |
|---|---|---|---|
| 6,366,959 | B1 | 4/2002 | Sidhu et al. |
| 6,526,140 | B1 | 2/2003 | Marchok et al. |
| 6,754,342 | B1 | 6/2004 | Surazski et al. |
| 6,829,244 | B1 | 12/2004 | Wildfeuer et al. |
| 7,058,568 | B1 | 6/2006 | Lewis |
| 7,167,451 | B1 | 1/2007 | Oran |
| 7,251,241 | B1 | 7/2007 | Jagadeesan et al. |
| 7,447,195 | B1 | 11/2008 | Chan et al. |
| 8,279,884 | B1 | 10/2012 | Narasimha et al. |
| 8,385,325 | B2 | 2/2013 | Vafin et al. |
| 8,693,355 | B2 | 4/2014 | Lundsgaard |
| 8,855,145 | B2 | 10/2014 | Vafin et al. |
| 8,948,213 | B2 | 2/2015 | Vafin et al. |
| 8,948,214 | B2 | 2/2015 | Vafin et al. |
| 2001/0012300 | A1 | 8/2001 | Raisanen |
| 2002/0105951 | A1 | 8/2002 | Hannuksela et al. |
| 2003/0050786 | A1 | 3/2003 | Jax et al. |
| 2003/0140347 | A1* | 7/2003 | Varsa .................. 725/90 |
| 2004/0002339 | A1 | 1/2004 | O'Connor |
| 2004/0066751 | A1 | 4/2004 | Tseng et al. |
| 2004/0081106 | A1 | 4/2004 | Bruhn |
| 2004/0204935 | A1 | 10/2004 | Anandakumar et al. |
| 2004/0233931 | A1* | 11/2004 | Cohen .................. 370/468 |
| 2005/0053055 | A1 | 3/2005 | Horvath et al. |
| 2005/0094655 | A1 | 5/2005 | Newson et al. |
| 2005/0207437 | A1 | 9/2005 | Spitzer |
| 2005/0229072 | A1 | 10/2005 | Setton et al. |
| 2006/0034338 | A1 | 2/2006 | Degenhardt et al. |
| 2006/0045138 | A1 | 3/2006 | Black et al. |
| 2006/0109856 | A1 | 5/2006 | Deshpande |
| 2006/0218636 | A1 | 9/2006 | Chaum |
| 2007/0133405 | A1 | 6/2007 | Bowra et al. |
| 2008/0101398 | A1* | 5/2008 | Ojala et al. .................. 370/412 |
| 2008/0232353 | A1 | 9/2008 | Vafin et al. |
| 2009/0016333 | A1 | 1/2009 | Wang et al. |
| 2009/0049188 | A1* | 2/2009 | Suneya et al. ............. 709/231 |
| 2010/0023634 | A1 | 1/2010 | Labonte et al. |
| 2011/0142140 | A1 | 6/2011 | Kure |
| 2011/0261145 | A1 | 10/2011 | Kamath et al. |
| 2012/0170469 | A1 | 7/2012 | Curcio et al. |
| 2013/0100968 | A1 | 4/2013 | Vafin |
| 2013/0100969 | A1 | 4/2013 | Vafin |
| 2013/0100970 | A1 | 4/2013 | Vafin |
| 2013/0163588 | A1 | 6/2013 | Vafin |

FOREIGN PATENT DOCUMENTS

| | | |
|---|---|---|
| CN | 102014443 | 4/2011 |
| EP | 1444811 | 3/2003 |
| EP | 1891502 | 11/2006 |
| EP | 1800483 | 6/2007 |
| EP | 1980043 | 8/2007 |
| EP | 2130203 | 10/2011 |
| GB | 2357006 | 6/2001 |
| GB | 2492830 | 1/2013 |
| WO | WO-02091570 | 11/2002 |
| WO | WO-03023707 | 3/2003 |
| WO | WO-2004075555 | 9/2004 |
| WO | WO-2005009019 | 1/2005 |
| WO | WO-2005079070 | 8/2005 |
| WO | WO-2006038090 | 4/2006 |
| WO | WO-2011097762 | 8/2011 |

OTHER PUBLICATIONS

"Combined Search and Examination Report", GB Application No. 1118408.2, Feb. 14, 2014, 6 pages.
"Combined Search and Examination Report", GB Application No. 1118392.8, Feb. 22, 2013, 6 pages.
"Final Office Action", U.S. Appl. No. 12/005,040, Jul. 19, 2012, 15 pages.
"Final Office Action", U.S. Appl. No. 13/774,866, Aug. 13, 2014, 18 pages.
"Foreign Notice of Allowance", AU Application No. 2007349607, Oct. 7, 2011, 3 pages.
"Foreign Notice of Allowance", EP Application No. 07872098.4, May 10, 2011, 4 pages.
"Foreign Office Action", AU Application No. 2007349607, Sep. 7, 2010, 2 pages.
"Foreign Office Action", CN Application No. 201210411881.7, Nov. 26, 2014, 14 pages.
"Foreign Office Action", CN Application No. 201210411882.1, Nov. 3, 2014, 13 pages.
"Foreign Office Action", CN Application No. 201210411922.2, Nov. 17, 2014, 15 pages.
"Foreign Office Action", EP Application No. 07872098.4, Jul. 14, 2014, 3 pages.
"Foreign Office Action", EP Application No. 07872098.4, Dec. 3, 2010, 4 pages.
"Foreign Office Action", EP Application No. 07872098.4, Jun. 29, 2012, 2 pages.
"Foreign Office Action", GB Application No. 1118392.8, Mar. 31, 2014, 3 pages.
"Foreign Office Action", GB Application No. 1118392.8, Oct. 9, 2014, 3 pages.
"Foreign Office Action", KR Application No. 10-2009-7021930, Feb. 18, 2011, 8 pages.
"International Search Report and Written Opinion", Application No. PCT/IB2007/004505, Nov. 7, 2008, 15 pages.
"Non-Final Office Action", U.S. Appl. No. 12/005,040, Oct. 25, 2011, 22 pages.
"Non-Final Office Action", U.S. Appl. No. 13/594,638, Mar. 28, 2014, 20 pages.
"Non-Final Office Action", U.S. Appl. No. 13/594,668, May 29, 2014, 17 pages.
"Non-Final Office Action", U.S. Appl. No. 13/594,692, Mar. 28, 2014, 15 pages.
"Non-Final Office Action", U.S. Appl. No. 13/774,866, May 23, 2014, 16 pages.
"Non-Final Office Action", U.S. Appl. No. 13/774,866, Dec. 16, 2014, 19 pages.
"Notice of Allowance", U.S. Appl. No. 12/005,040, Oct. 22, 2012, 8 pages.
"Notice of Allowance", U.S. Appl. No. 13/594,638, Sep. 12, 2014, 7 pages.
"Notice of Allowance", U.S. Appl. No. 13/594,668, Sep. 12, 2014, 8 pages.
"Notice of Allowance", U.S. Appl. No. 13/594,692, May 28, 2014, 6 pages.
"Search Report", GB Application No. 1118401.7, Feb. 13, 2013, 6 pages.
"Supplemental Notice of Allowance", U.S. Appl. No. 13/594,638, Jan. 7, 2015, 2 pages.
"Supplemental Notice of Allowance", U.S. Appl. No. 13/594,668, Jan. 7, 2015, 2 pages.
"Foreign Office Action", GB Application No. 1118392.8, Apr. 2, 2015, 2 pages.
"Final Office Action", U.S. Appl. No. 13/774,866, Apr. 30, 2015, 27 pages.
"Foreign Office Action", GB Application No. 1501928.4, Mar. 26, 2015, 7 pages.
"Foreign Office Action", GB Application No. 1501929.2, Mar. 26, 2015, 7 pages.
"Foreign Notice of Allowance", CN Application No. 201210411882.1, Jul. 2, 2015, 4 pages.
"Foreign Office Action", CN Application No. 201210411881.7, Aug. 18, 2015, 7 pages.
"Foreign Office Action", GB Application No. 1501928.4, Jun. 26, 2015, 4 pages.

(56) References Cited

OTHER PUBLICATIONS

"Foreign Office Action", GB Application No. 1501929.2, Jun. 26, 2015, 3 pages.

"Office Action Issued in UK Patent Application No. 1501928.4", Mailed Date: Sep. 28, 2015, 2 pages. (MS# 336089.05).

"Office Action Issued in UK Patent Application No. 1501929.2", Mailed Date: Sep. 28, 2015, 3 pages. (MS# 336089.06).

* cited by examiner

JITTER BUFFER

RELATED APPLICATION

This Application is a continuation of and claims priority under 35 U.S.C. §120 to U.S. patent application Ser. No. 13/594,668, filed on Aug. 24, 2012, now U.S. Pat. No. 8,948,214, which claims priority under 35 USC 119 or 365 to Great Britain Application No. 1118392.8, filed Oct. 25, 2011, the disclosure of which is incorporate in its entirety.

BACKGROUND

In a real-time communication event, such as an audio or video call, a transmitter may transmit data to a receiver over a communication channel. A communication channel may exist in one (or more) of many different possible networks. For example, a communication channel may exist in the Internet or in a wireless network such as a mobile telecommunications network. The data (which may be transmitted in the form of data packets) may, detrimentally, be delayed or corrupted as it is transmitted over the communication channel. There are various techniques which may be employed to cope with the delay or corruption of the data as it is transmitted over the communication channel. As an example, a jitter buffer may be used at a receiver in order to smooth out the effects of variations in the delay of transmission of data in a real-time communication event. This increases the possibility of achieving continuous playback of the data at the receiver despite random variations in packet propagation delay (known as jitter). The jitter buffer is placed at the receiver and is used to accumulate a few data packets before starting playback at the receiver, thus introducing an extra delay (jitter buffer delay) into the communication event that helps to accommodate the data packet propagation delay jitter. The jitter buffer may adapt its delay during the communication event according to variations in the packet propagation delay. The jitter buffer may also sort data packets sent from the transmitter which arrive at the receiver out of order, such that the data packets can be played back at the receiver in the correct order. The jitter buffer may also discard data packets which are late, i.e. which arrive at the jitter buffer after the time at which they were scheduled to be played out from the jitter buffer at the receiver in the real-time communication event. The state of the jitter buffer describes the current conditions of the jitter buffer and may include, for example, the jitter buffer delay, jitter buffer size and/or an indication of the available space in the jitter buffer. The jitter buffer delay can be expressed in terms of an amount of time, e.g., a number of seconds (or more commonly, milliseconds) or in terms of a number of frames of content, e.g., of audio or video data. The jitter buffer size and the available space in the jitter buffer can be expressed in terms of the amount of data, such as a number of bits, bytes, or packets.

The jitter buffer delay can be controlled according to a number of trade-offs including:

1. A trade-off between the jitter buffer delay and the number of late data packets (i.e. the number of data packets arriving at the jitter buffer after the time at which they were scheduled to be played out from the jitter buffer at the receiver in the real-time communication event). While higher jitter buffer delay reduces the amount of late packets, the resulting increase in the playback delay can adversely affect the interactivity of real-time communication. So the jitter buffer delay can be balanced against the number of late data packets. In this way, if conditions on the communication channel used for the communication event change such that the number of late data packets changes, the jitter buffer delay can be controlled to balance the change in the number of late data packets.

2. A trade-off between the adaptation of the jitter buffer delay and the amount of modification introduced into the received signal. Increasing or decreasing the jitter buffer delay means that a part of the signal has to be played out at the receiver slower or faster than intended, which can result in quality degradations. However, it can still be beneficial to adapt the jitter buffer delay when necessary, so the adaptation of the jitter buffer can be balanced against the amount of modification introduced into the received signal.

In this way the receiver can control the jitter buffer delay which is used in a communication event.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The way in which data is processed for transmission to a jitter buffer in a real-time communication event and the state of the jitter buffer are interlinked. Various embodiments control processing parameters describing how data is to be processed for transmission from a transmitter to a jitter buffer of a receiver in a real-time communication event based on the state of the jitter buffer. Various embodiments enable control of the state of a jitter buffer based on the processing parameters which are used to process data for transmission from a transmitter to the jitter buffer in a real-time communication event. In some embodiments the processing parameters and the jitter buffer state may be determined jointly.

In one or more embodiments, there may be provided a method, transmitter, receiver or computer program product for transmitting or receiving data of a real-time communication event, the data being transmitted from the transmitter to a jitter buffer of the receiver. At least one processing parameter describing how data is to be processed for transmission from the transmitter to the jitter buffer in the real-time communication event may be determined at the transmitter. Data may be processed for transmission from the transmitter to the jitter buffer in accordance with the determined at least one processing parameter. Control information based on the determined at least one processing parameter may be transmitted from the transmitter to the receiver, wherein the control information is for use by the receiver to control a state of the jitter buffer. The processed data may be transmitted from the transmitter to the jitter buffer of the receiver in the real-time communication event.

The control information may be used to control the state of the jitter buffer based on the processing parameter(s). This allows the state of the jitter buffer to be controlled in a manner which suits the way in which the data is processed at the transmitter for transmission to the jitter buffer.

BRIEF DESCRIPTION OF THE DRAWINGS

For a better understanding of the various embodiments and to show how the same may be put into effect, reference will now be made, by way of example, to the following drawings in which.

DETAILED DESCRIPTION

Figure 1:
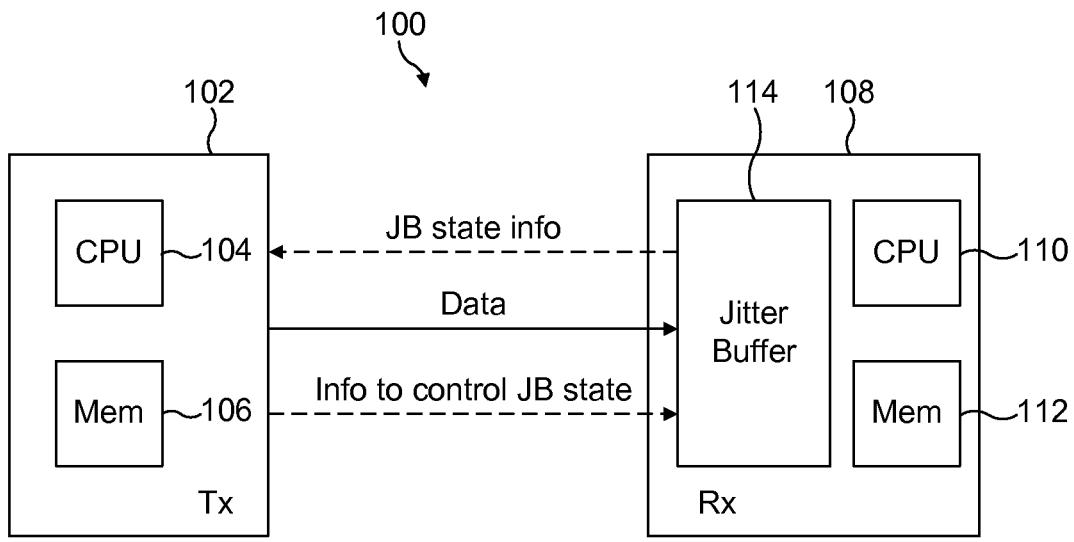
FIG. 1 shows a communication system in accordance with one or more embodiments.

With reference to FIG. 1 there is now described a communication system 100 according to one or more embodiments. The communication system 100 comprises a transmitter 102 and a receiver 108. The transmitter 102 comprises a processor 104 for processing data and one or more computer-readable storage media, e.g., a memory 106 for storing data. The receiver 108 comprises a processor 110 for processing data, one or more computer-readable storage media, e.g., a memory 112 for storing data and a jitter buffer 114 for receiving data from the transmitter 102.

The computer-readable storage media may include volatile media (such as random access memory (RAM)) and/or non-volatile media (such as read only memory (ROM), Flash memory, optical disks, magnetic disks, and so forth). The computer-readable storage media may include fixed media (e.g., RAM, ROM, a fixed hard drive, and so on) as well as removable media (e.g., Flash memory, a removable hard drive, an optical disc, and so forth). The computer-readable storage media may be configured in a variety of other ways.

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of a computing device, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Hardware elements and computer-readable media are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware element. The computing device may be configured to implement particular instructions and/or functions corresponding to the software and/or hardware modules. Accordingly, implementation of a module that is executable by a computing device as software may be achieved at least partially in hardware, e.g., through use of computer-readable storage media and/or hardware elements of the processing system. The instructions and/or functions may be executable/operable by one or more articles of manufacture (for example, one or more computing devices and/or processing systems) to implement techniques, modules, and examples described herein.

In operation the transmitter 102 can process data (e.g. retrieved from the memory 106) to form a data stream comprising a plurality of data packets (e.g. using the processor 104). The data stream can then be transmitted over a communication channel through a network to the jitter buffer 114 of the receiver 108. As described above, the data is stored in the jitter buffer for a short time (that is, for the "jitter buffer delay") before being output from the jitter buffer for processing at the receiver 108 (e.g. using the processor 110). The processing at the receiver 108 may involve depacketising and decoding the data from the data stream. The data may be stored in the memory 112 at the receiver 108, or output from the receiver 108, e.g. to a user. The data in the data stream may relate to a real-time communication event (such as a voice call or a video call) between a user of the transmitter 102 and a user of the receiver 108.

The network over which the data is transmitted from the transmitter 102 to the receiver 108 may be any suitable network which has the ability to provide a suitable communication channel. The network could be a Wide Area Network (WAN) or a Local Area Network (LAN). As examples, the network may be an intranet, the Internet or a telephony network such as a mobile telephone network. The transmitter 102 and receiver 108 may be implemented in any suitable apparatus or device for transmitting and receiving a data stream over the network respectively. For example, the transmitter 102 and receiver 108 may be implemented as user devices such as personal computers or telephones which have the ability to connect to the network.

The state of the jitter buffer 114 changes as data is received at the jitter buffer 114 from the transmitter 102 and as data is removed from the jitter buffer 114 for processing in the receiver 108. The state of the jitter buffer 114 may be described by parameters such as the delay or size of the jitter buffer 114 which describe the amount of data currently in the jitter buffer 114, in terms of a time (the jitter buffer delay) for which data will be stored in the jitter buffer 114 from being received from the transmitter 102 until being removed for processing in the receiver 108, or in terms of the number of frames of content of the data in the jitter buffer 114 or in terms of the amount of data, e.g. measured as a number of bits or a number of bytes of data present in the jitter buffer 114. The state of the jitter buffer 114 may also describe the available space in the jitter buffer 114, which can be determined as the maximum allowed size of the jitter buffer 114 minus the current size of the jitter buffer 114.

It can be seen that the state of the jitter buffer 114 affects how data is received at the receiver 108. Therefore, when the state of the jitter buffer 114 changes it may be advantageous to change the way in which data is processed for transmission to the receiver 108 in accordance with the current state of the jitter buffer 114. It can be beneficial to transmit the jitter buffer state (e.g., the current size or delay of the jitter buffer 114 and the available space in the jitter buffer 114) of the receiver 108 to the transmitter 102, wherein the operation of processing modules of the transmitter can be controlled based on the state of the jitter buffer 114.

Figure 2:
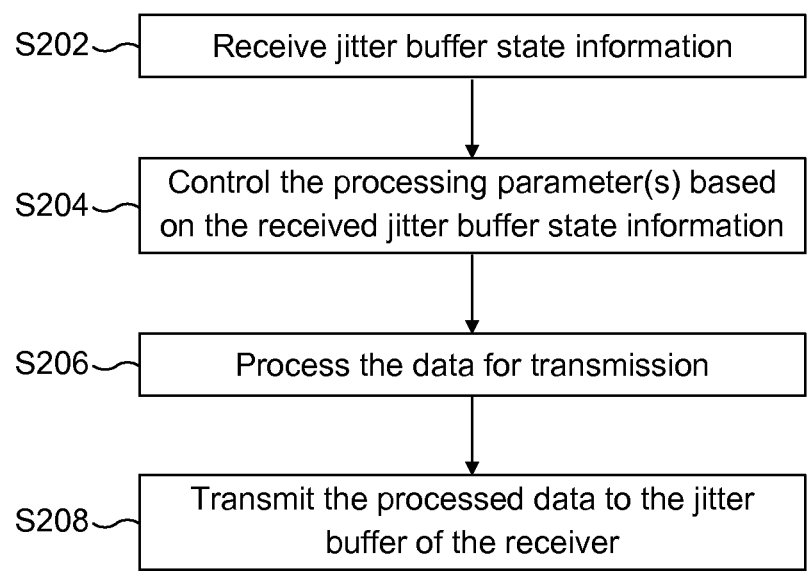
FIG. 2 is a flow chart for a first process of transmitting data from a transmitter to a receiver in accordance with one or more embodiments.

With reference to FIG. 2 there is described a first method of transmitting data from the transmitter 102 to the jitter buffer 114 of the receiver 108. In step S202 the transmitter 102 receives jitter buffer state information from the jitter buffer 114 of the receiver 108 (as shown in FIG. 1). The jitter buffer state information indicates the current state of the jitter buffer 114, and may for example, indicate the current delay or size of the jitter buffer 114, and may also indicate the available space in the jitter buffer 114. The jitter buffer state information may indicate other attributes of the jitter buffer 114 which may be useful in determining how best to process data for transmission from the transmitter 102 to the jitter buffer 114 of the receiver 108.

In step S204 at least one processing parameter of the transmitter 102 is controlled based on the jitter buffer information received in step S202. The processing parameter(s) describes how data is to be processed for transmission from the transmitter 102 to the jitter buffer 114 of the receiver 108 in a real-time communication event. Examples of possible processing parameters which may be controlled in step S204 include an encoding bit rate, a FEC depth, a packetization delay and an interleaving delay. These examples are described in more detail below. As would be apparent to a person skilled in the art, other processing parameters for processing data for transmission from the transmitter 102 to the jitter buffer 114 of the receiver 108 may be controlled in a similar manner to the examples given herein.

In step S206 data is processed for transmission at the transmitter 102 in accordance with the processing parameter(s) determined in step S204. The data may be processed by a number of processing modules in the transmitter 102. For example, there may be an encoding module, a FEC module, a packetization module and an interleaving module. Each of the modules may operate in accordance with the processing parameter(s) determined in step S204. By processing the data in accordance with the processing parameter(s) determined in step S204 the data is processed in such a manner that is suitable for being received at the jitter buffer 114 according to the state of the jitter buffer 114.

In step S208 the processed data is transmitted from the transmitter 102 to the jitter buffer 114 of the receiver 108. The data is transmitted over a network and, detrimentally, there may be some variable delay or corruption to the data as it is transmitted. As described above, the use of the jitter buffer 114 at the receiver 108 helps to overcome the problems introduced by variable delay and corruption of the data as it is transmitted.

There is therefore described above a method of transmitting data in a real-time communication event from the transmitter 102 to the receiver 108 whereby the way in which data is processed at the transmitter 102 for transmission to the receiver 108 is controlled based on the state of the jitter buffer 114 that receives the data at the receiver 108.

The current jitter buffer state affects the performance of a number of processing modules used to process data for transmission to the jitter buffer 114 in a real-time communication event, as exemplified below.

1. Encoder Bit Rate

The transmitter 102 may comprise a processing module for encoding data for transmission to the receiver 108 in a real-time communication event. The processing module may be implemented at the transmitter 102 in hardware or in software (e.g. executed on the CPU 104). The data may be encoded using any suitable known encoding technique. Particular encoding techniques may be appropriate for different types of data. For example, where the data includes speech from a user of the transmitter 102 then the encoding technique may include a specific speech encoder for encoding the speech portions of the data. Other encoding techniques may also be used, e.g. to compress the data for transmission to the receiver 108. The data is processed using an encoding bit rate such that the encoded data has the particular encoding bit rate. A higher encoding rate typically results in a higher quality signal but requires more data to be transmitted over the communication channel to the receiver 108.

Figure 3:
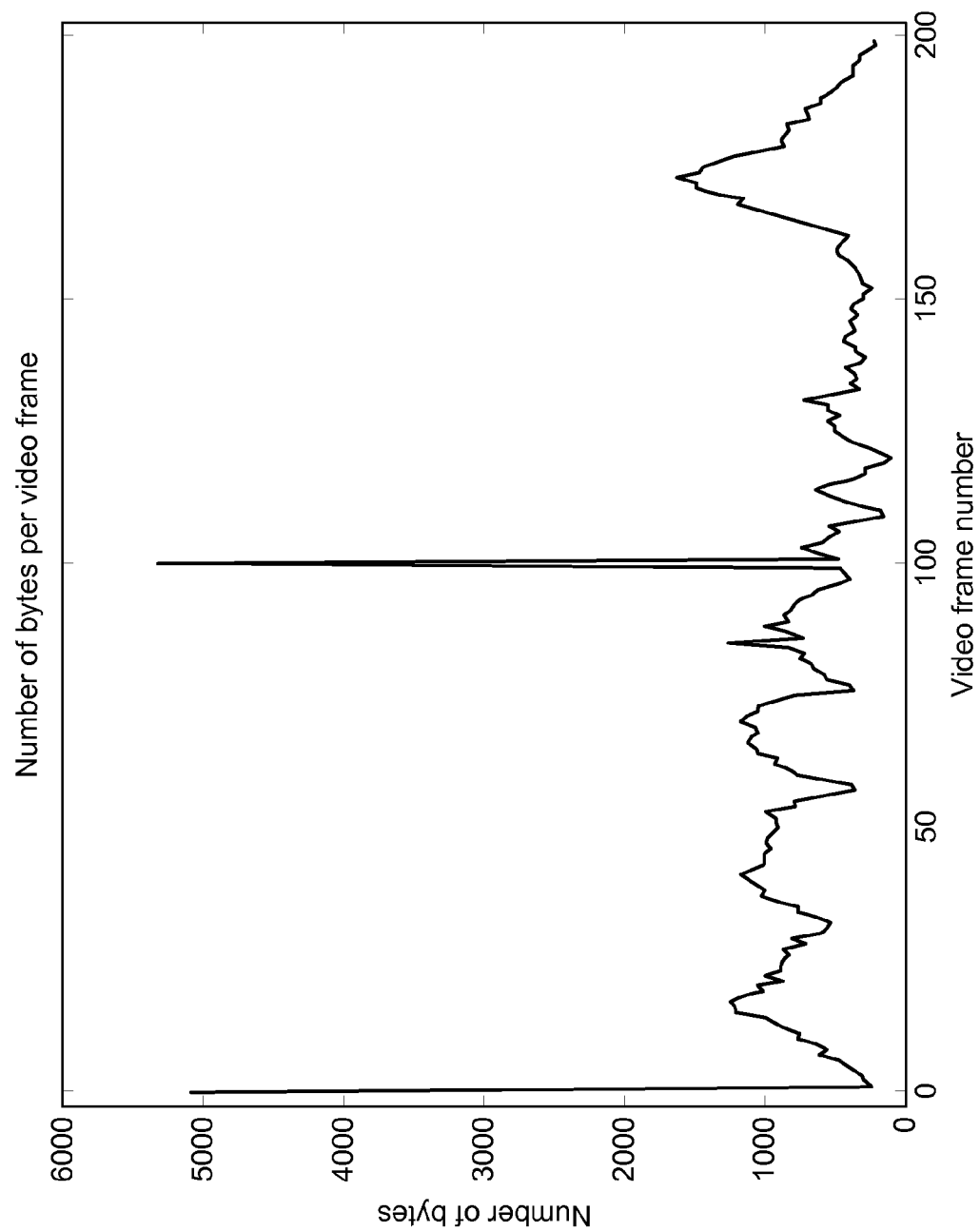
FIG. 3 is a graph showing the number of bytes in a sequence of video frames in one example in accordance with one or more embodiments.

The transmitter 102 may adapt its encoding bit rate, based on the input signal that is to be transmitted and/or based on conditions of the communication channel on which the data is to be transmitted. For example, the input signal may be a video signal and the encoder may produce a sudden increase (peak) in the instantaneous bit rate, as shown in FIG. 3. FIG. 3 shows a graph representing the number of bytes of each frame of a video signal once it has been encoded at the transmitter 102. It can be seen that the encoding bit rate is not the same for each video frame, and in particular some of the video frames (e.g. frame number 0 and frame number 100) are encoded at a much higher bit rate than the other video frames. The variation in the bit rate of the frames of the video signal may occur because different encoding techniques are used to encode the different video frames. A similar situation may occur when the input signal is an audio signal. For example, when a portion of an audio or a video signal is encoded independently of previously encoded portions then the bit rate of the encoded video or audio frame is typically relatively high. This is in contrast to other ones of the video or audio frames which may be encoded using differential-coding techniques, and therefore the encoded bit rate of those other video or audio frames is typically relatively low. Another example of a sudden increase in the encoding bit rate is when a portion of an input signal is encoded dependently on previously encoded portions, but using a less bit-rate efficient differential-coding mode. In embodiments when the input signal is a video signal, refraining from differential coding for some of the video frames can be beneficial (even though the bit rate is increased), for example in the case of a sudden change in the input video signal (e.g. a scene change in the video signal), or when it is desired to stop an error propagation effect due to a packet loss.

A peak in the instantaneous bit rate of the encoded data results in larger data packets and/or in a larger number of data packets being transmitted from the transmitter 102 to the jitter buffer 114 of the receiver 108 in the real-time communication event. This increase in the amount of data is accommodated by the jitter buffer 114 at the receiver 108. If the maximum allowed jitter buffer size, e.g., expressed in number of bits/bytes or packets, is lower than the amount of data needed to be placed in the jitter buffer 114, then some data will be dropped. This may lead to a decrease in performance of the communication system 100 in the real-time communication event.

In another scenario, a peak in the instantaneous bit rate of the encoded data leads to a higher propagation delay of the resulting data packets. In this case, it is beneficial when the jitter buffer has enough earlier data to provide for playback while waiting for the new packets to arrive.

In accordance with the method shown in FIG. 2, an encoding module at the transmitter 102 may adapt its encoding bit rate in accordance to the current size of the jitter buffer 114 or in accordance to the currently available space in the jitter buffer 114 (that is, the maximum allowed size minus the current size). The encoding bit rate is a processing parameter which is controlled in step S204 in accordance with the state of the jitter buffer 114. If the available space in the jitter buffer 114 is small, then the encoding module of the transmitter 102 should refrain from suddenly increasing the bit rate of the data which is to be transmitted to the jitter buffer 114. On the other hand, a bottleneck in the transmission of data in the real-time communication event may be the communication channel between the transmitter 102 and the receiver 108 (rather than the available space at the jitter buffer 114). In this case, an increase in the bit rate of the data may cause an increase in the propagation delay of the resulting data packets as they are transmitted over the communication channel, whilst the jitter buffer 114 may have enough earlier data to provide for playback while waiting for the new packets to arrive (as indicated by the current size of the jitter buffer 114). In this situation, the encoder may still increase the bit rate (based on the indication of the current size of the jitter buffer 114) despite the higher propagation delay because the jitter buffer can continue to output earlier data that it has already received so there will be no delay in the output of data at the receiver 108 and the quality of the data can remain high according to the increased bit rate.

It can therefore be seen that the encoding bit rate used to encode data for transmission from the transmitter 102 to the jitter buffer 114 of the receiver 108 can be controlled in dependence upon the state of the jitter buffer 114 as indicated by the jitter buffer state information received at the transmitter 102 from the receiver 108 in step S202.

2. Forward Error Correction

The data in a data stream may be divided into data packets for transmission over a communication channel between the transmitter 102 and the receiver 108. In an ideal system, the communication channel is lossless such that every data packet transmitted from the transmitter 102 over the communication channel is received at the jitter buffer 114 of the receiver 108. However, in real physical systems, the communication channel may be lossy, meaning that some of the transmitted data packets will be lost on the communication channel and as such will not be received at the jitter buffer 114 of the receiver 108. This may be detrimental. Correction schemes can be used to help recover, at the receiver 108, at least some of the lost data packets.

As an example, forward error correction (FEC) is one correction scheme which can be used to combat packet loss in a communication channel. FEC produces redundant data (as FEC data units) in addition to the original data units and includes the FEC data units in the data stream which is transmitted over the communication channel. A FEC scheme that transmits original and redundant FEC data is called a systematic FEC scheme. A FEC scheme that does not transmit original data is called a non-systematic scheme. In the latter case, the total amount of data transmitted is still higher than the amount of original data, to provide redundancy. For simplicity, but without loss of generality, we talk about systematic FEC schemes herein. The redundant FEC data units may be placed in their own packets, separate to the data packets in the data stream. Alternatively, or additionally, the FEC data units may be appended (or "piggybacked") to the original data packets in the data stream. For simplicity, but without loss of generality, we talk about separate original and FEC packets herein. When some of the original data packets are lost in the communication channel, the successfully arrived FEC data units and the successfully arrived data packets can be used to recover (at least some of) the lost data packets. That is, FEC reduces the packet loss seen by a decoder of the receiver, compared to the actual packet loss in the communication channel.

Figure 4C:
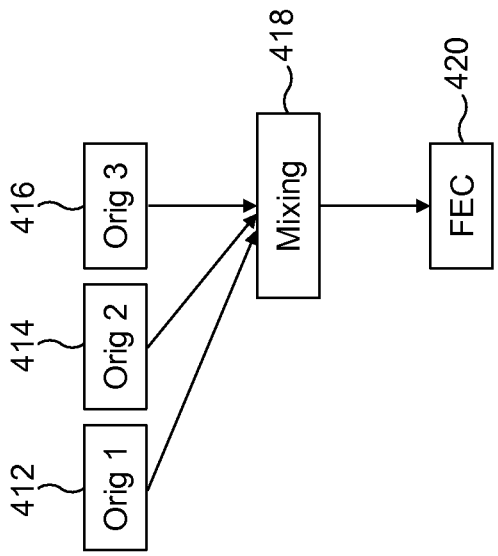
FIG. 4c illustrates a third example of how a FEC data unit may be generated in accordance with one or more embodiments.
Figure 4B:
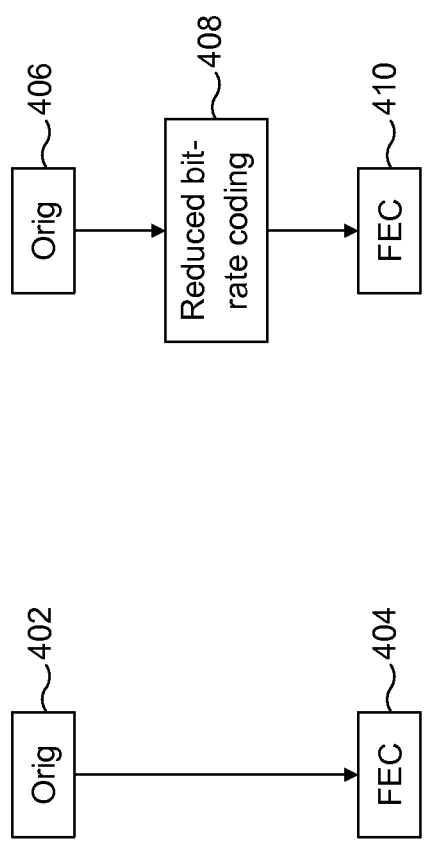
FIG. 4b illustrates a second example of how a FEC data unit may be generated in accordance with one or more embodiments.
Figure 4A:
FIG. 4a illustrates a first example of how a FEC data unit may be generated in accordance with one or more embodiments.

FIGS. 4a, 4b and 4c illustrate three examples of how a FEC data unit may be generated. As illustrated in FIG. 4a, a FEC data unit 404 may be generated as an exact copy of an original data packet 402 of the data stream. By including both the data packet 402 and the FEC data unit 404 in the data stream, the data in the data packet 402 is transmitted twice. Therefore if the data packet 402 is lost during transmission but the FEC data unit 404 is successfully received then the data in the data packet 402 can be successfully recovered at the receiver (using the FEC data unit 404). As illustrated in FIG. 4b a module 408 may be used to generate a FEC data unit 410 which is a copy of an original data packet 406 encoded at a lower bit rate. If the data packet 406 is lost during transmission but the FEC data unit 410 is successfully received then the data in the data packet 406 can be at least partially recovered at the receiver based on the FEC data unit 410. It should be noted that if the data packets 402 and 406 have the same size (e.g. the same number of bits) then the FEC data unit 410 will have a smaller size (e.g. fewer bits) than the FEC data unit 404. Therefore, although the FEC data unit 404 may be more useful in recovering the data packet 402 than the FEC data unit 410 is in recovering the data packet 406, it may be beneficial to generate FEC data units as shown in FIG. 4b since the FEC data unit 410 uses less of the available bit rate on the communication channel for the data stream than the FEC data unit 404 uses. As illustrated in FIG. 4c a mixing module 418 may be used to generate a FEC data unit 420 from a plurality of the original data packets, e.g. data packets 412, 414 and 416. Finite field (Galois field) arithmetic may be used to combine original data packets. For example the mixing module 418 may determine the bit-by-bit result of an XOR function applied to the three data packets 412, 414 and 416 to generate the FEC data unit 420. In another approach, data packets 412, 414 and 416 are combined byte-by-byte using Galois field GF ($2^8$) arithmetic to generate the FEC data unit 420. In this sense the FEC data unit 420 is the result of combining or mixing the original data packets 412, 414 and 416. If one of the data packets 412, 414 and 416 is lost during transmission but the other two data packets and the FEC data unit 420 are successfully received then the data in the lost data packet can be successfully recovered at the receiver (using the other two data packets and the FEC data unit 420).

It can therefore be seen that FEC data units may be generated in a number of different ways. Different FEC schemes describe different ways in which the FEC data units are to be generated. A FEC scheme may describe factors relating to the generation of the FEC data units, such as: the number of FEC data units that are generated; which data packets are used to generate the FEC data units; how the FEC data units are transmitted (e.g. as separate packets or by appending the FEC data units to the data packets); and where in the data stream the FEC data units are placed. The loss-recovery performance of a FEC scheme describes the ability of the FEC scheme to recover lost data packets at the receiver using the FEC data units.

Generally, increasing the number of FEC data units in the data stream improves the loss-recovery performance of a FEC scheme. However, increasing the number of FEC data units in the data stream comes at a cost of bit rate efficiency.

Loss-recovery performance of a FEC scheme largely depends on FEC overhead and FEC depth.

FEC overhead describes the amount of redundant data relative to the amount of original data (e.g., the number of FEC packets relative to the number of original packets). Higher overhead generally improves the loss-recovery performance of a FEC scheme. On the other hand, higher overhead comes at a cost of bit rate efficiency. If the coding bit rate of original data is kept unchanged, then increased redundancy leads to increased total bit rate. Alternatively, if the total bit rate is constrained, then increased redundancy comes at a price of reduced coding bit rate of original data.

FEC depth describes the displacement between the oldest and the newest of the data packets (including both of those data packets) that can be protected by (i.e. combined into) a FEC data unit. In other words, it describes the maximum number of original data packets that can be combined into a FEC data unit. Higher depth provides more possibilities of different combinations of data packets for the FEC data units, thus achieving higher flexibility of a FEC scheme, for example, to varying channel conditions. In one extreme example, where a FEC data unit is constrained to be a copy of one original data packet, higher depth provides a possibility for larger separation of the original data packet and its copy (the FEC data unit) in time. This is advantageous in bursty packet-loss conditions, since it minimizes the probability of both the original data packet and the copy (the FEC data unit) being lost in a burst on the communication channel.

Figure 5:
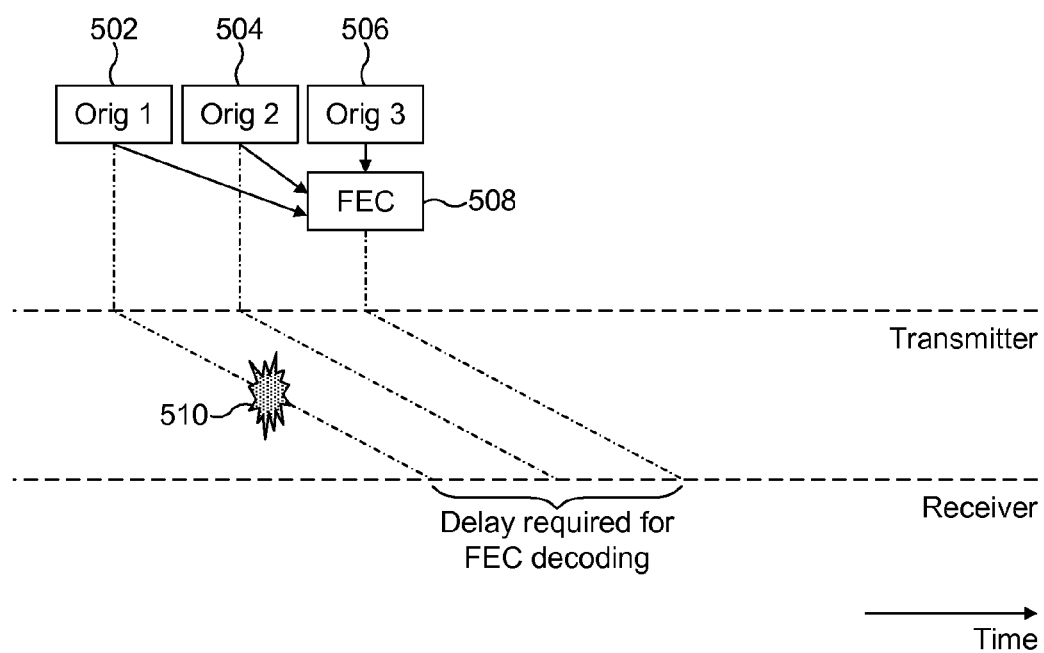
FIG. 5 is a representation of a data stream being transmitted in a communication system using FEC in accordance with one or more embodiments.

The FEC depth is related to delay in the transmission. A FEC data unit combines previously-generated original data packets, and therefore there is no additional algorithmic delay at the transmitter 102 caused by using FEC. However, in order to reconstruct a lost data packet at the receiver 108, we assume a delay at the receiver 108, since the FEC data unit is generated and transmitted later than the data packets on which it is based. This can be seen in the timing diagram shown in FIG. 5. FIG. 5 shows a situation in which three of the data packets (502, 504 and 506) of the data stream are used to generate the FEC data unit 508. The FEC data unit cannot be generated until all three of the data packets 502, 504 and 506 have been generated. Therefore, the data packets 502 and 504 will be transmitted from the transmitter 102 before the FEC data unit 508 is generated at the transmitter 102. Therefore, the earliest that the FEC data unit 508 can be transmitted is straight after the data packet 506. This scenario is shown in FIG. 5. The transmission of the data packets and the FEC data unit takes some finite amount of time. FIG. 5 depicts the loss (510) of the data packet 502 during the transmission over the lossy communication channel through the network. However, the data packets 504 and 506 and the FEC data unit 508 are all successfully received at the receiver 108. The data packets 504 and 506 and the FEC data unit 508 can be used to recover the lost data packet 502 at the receiver 108. However, the lost data packet 502 cannot be recovered until all three of: the data packets 504 and 506 and FEC data unit 508 have been received at the jitter buffer 114 of the receiver 108. Therefore, as shown in FIG. 5, there is a delay required for FEC recovery of the data packet 502 between the time when the data packet 502 should have been received at the receiver 108 (if it had not been lost) and the time at which the data packet can be recovered using the FEC data unit 508. If the delay requirement for the data stream is not satisfied, the lost data packet 502 will be declared as not decodable at the receiver 108 prior to the arrival of the FEC data unit 508. This will most likely cause the performance of the FEC scheme to drop significantly.

However, this delay need not be necessarily introduced at the receiver 108 by FEC as an additional delay. For example, the required delay may already exist at the receiver 108. One possible cause of delay at the receiver 108 is the presence of the jitter buffer 114. As described above, the jitter buffer 114 introduces a delay into the data stream in order to mitigate random variations in packet arrival times (jitter). If the FEC data unit 508 is received before the time at which the data packet 502 was due to be output from the jitter buffer 114 (had it not been lost during transmission) then it may be possible to recover the data packet 502 without introducing any extra delay at the receiver 108 over and above the delay already introduced by the jitter buffer 114. The FEC depth should be chosen so as to keep the delay between a lost data packet and a FEC data unit which can be used to recover the lost data packet within the delay requirements at the receiver 108. Therefore, for real-time data transmission (e.g. video call or audio call) the FEC depth may be set to a relatively low number.

The FEC scheme at the transmitter 102 may choose the highest depth possible given the size of the jitter buffer 114, without further increasing (or minimally increasing) the delay at the receiver 108. When the size of the jitter buffer 114 increases, the FEC depth is increased correspondingly. When the jitter buffer size is to be reduced, the FEC depth is reduced correspondingly (or an additional delay is introduced at the receiver 108 to cope with FEC depth). In order to avoid a sudden FEC performance drop in the latter case, the size of the jitter buffer 114 should not be reduced before the FEC depth is reduced in response to the desired jitter buffer size decrease (or an additional delay should be introduced at the receiver to cope with FEC depth).

3. Packetization

The transmitter 102 may comprise a processing module for packetizing data into data packets for transmission to the receiver 108 in a real-time communication event. The processing module may be implemented at the transmitter 102 in hardware or in software (e.g. executed on the CPU 104). The protocol for dividing the data into data packets (e.g. the form of the headers of the data packets, and other such implementation details) may depend upon the nature of the communication channel on which the data is to be transmitted, e.g. the type of network through which the data packet is to be transmitted.

When coded data units are small, it may be advantageous to place them into one larger data packet for transmission instead of using separate small data packets. This reduces the associated packet header overhead. In other words, since fewer data packets are transmitted there are fewer packet headers and as such the amount of packet header data that is transmitted is reduced.

Figure 6:
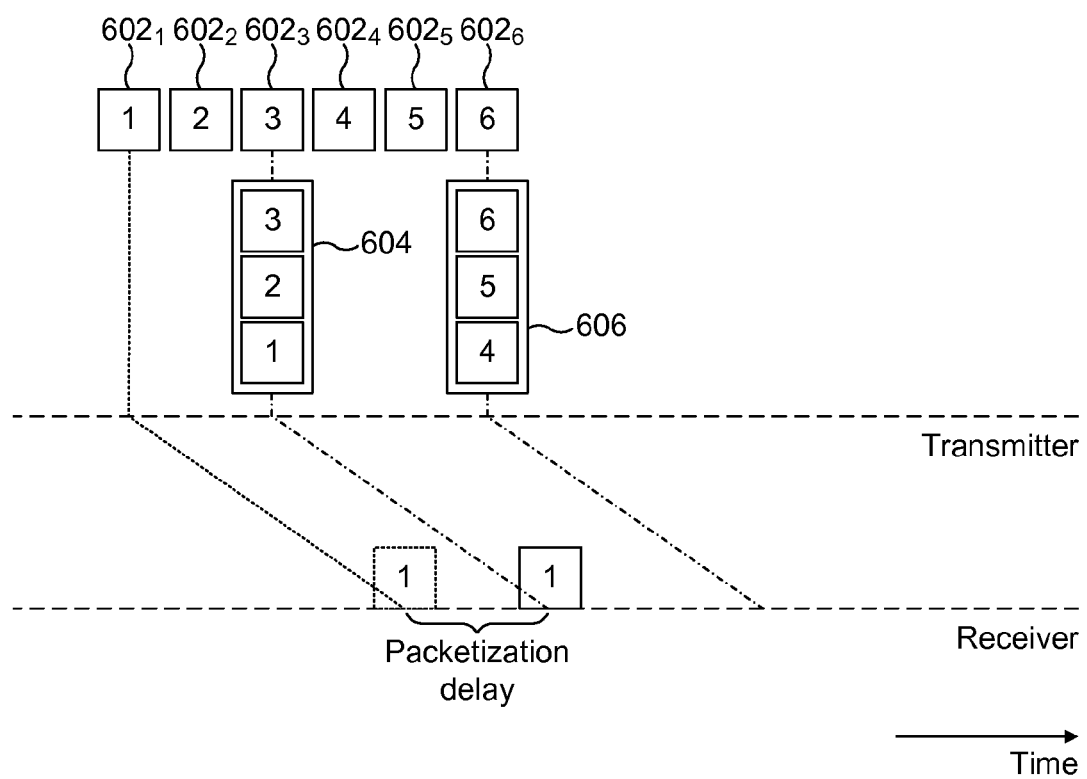
FIG. 6 is a representation of a packetized data stream being transmitted in a communication system in accordance with one or more embodiments.

FIG. 6 shows an example in which six consecutive data units $602_1$ to $602_6$ of a data stream are to be transmitted from the transmitter 102 to the receiver 108. In the example shown in FIG. 6 the data units are transmitted in data packets, whereby three data units are transmitted in each data packet. That is, instead of transmitting six small packets each containing just one of the data units, only two larger packets are transmitted. For example two data packets 604 and 606 are transmitted from the transmitter 102 to the receiver 108 in the example shown in FIG. 6. The data packet 604 includes the first three data units (data units 1, 2 and 3) and the data packet 606 includes the next three data units (data units 4, 5 and 6).

While such packetization of the data units reduces the packet header overhead, it comes at a price of delay. We refer to this delay as packetization delay. For example, in the situation shown in FIG. 6 data unit 1 is not transmitted before data unit 3 is generated because data units 1, 2 and 3 are all transmitted together in data packet 604. This means that data unit 1 has a higher delay between being generated at the transmitter 102 and being received at the receiver 108 than the corresponding delay of data unit 3. The packetization delay is shown in FIG. 6 as the time interval between the time at which data unit 1 would have been received at the receiver 108 if each data unit was transmitted separately and the time at which data unit 1 is received in data packet 604.

However, if the receiver 108 can tolerate the packetization delay of data unit 1, for example if data unit 1 is not required for decoding and/or playback at the receiver 108 until the data packet 604 is received at the receiver 108, then the packetization delay does not become an additional delay/cost in the transmission of the data units. This can be the case due to jitter buffer delay at the receiver 108. For example, the jitter buffer 114 may have enough earlier data (preceding data unit 1 in the data stream) to provide for continuous decoding and/or playback before the data packet 604 arrives. Therefore the state of the jitter buffer 114, in particular the current jitter buffer delay will affect the amount of packetization delay that can be tolerated.

The jitter buffer state information received at the transmitter 102 from the receiver 108 in step S202 is used by a packetization scheme implemented at the transmitter 102 to control the packetization delay of the transmitted data. For example, the packetization delay may be controlled such that it is maximized given the jitter buffer delay of the jitter buffer 114, without further increasing (or minimally increasing) the total delay of the data units of the transmitted data stream. Therefore the packetization delay may be controlled such that it corresponds to the delay of the jitter buffer 114. This means that the packetization delay may be controlled to equal (or approximately equal) the delay of the jitter buffer 114.

4. Interleaving

The transmitter 102 may comprise a processing module for interleaving data units for transmission to the receiver 108 in a real-time communication event. The processing module may be implemented at the transmitter 102 in hardware or in software (e.g. executed on the CPU 104). The protocol for interleaving the data units may depend upon the nature of the communication channel on which the data is to be transmitted, e.g. the type of network through which the interleaved data units are to be transmitted.

Interleaving is used to arrange data units in non-sequential way in order to distribute and minimize the effect of packet loss during transmission. Interleaving reduces the probability that consecutive data units do not arrive at the receiver 108 due to a packet loss or a packet-loss burst during the transmission of the data stream. Losing non-consecutive data units typically leads to less degradation in the quality of the data stream compared to losing consecutive data units. In addition, interleaving increases the probability that neighbouring data units are available for concealment of a lost data unit, which thereby typically leads to higher concealment quality of lost units. Interleaving can be used both when forming data packets and when transmitting data packets.

Figure 7:
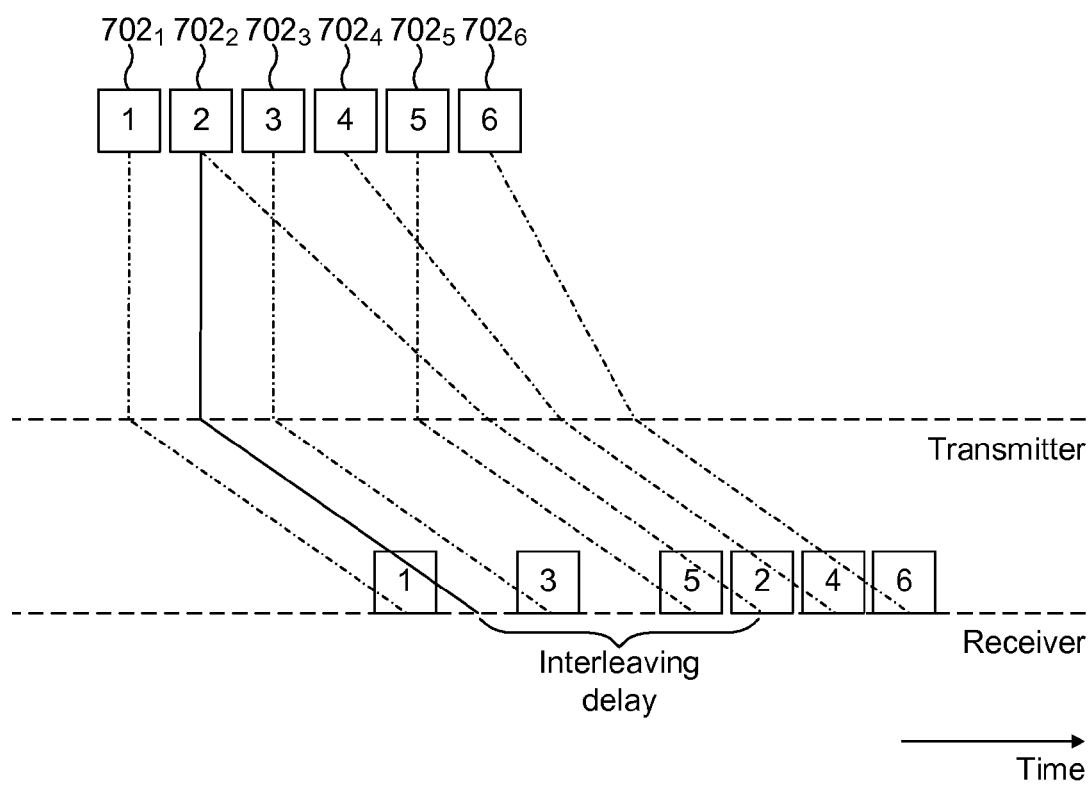
FIG. 7 is a representation of an interleaved data stream being transmitted in a communication system in accordance with one or more embodiments.

In one example, interleaving is used when transmitting data packets. FIG. 7 shows six consecutive data units where each unit is placed into a separate data packet ($702_1$ to $702_6$) for transmission from the transmitter 102 to the receiver 108. In other embodiments as described above more than one of the data units may be grouped into each data packet for transmission according to a packetization scheme at the transmitter 102. When no interleaving is applied, the data packets 702 are transmitted in the order {1, 2, 3, 4, 5, 6}, that is in consecutive order. In this case, a loss burst (a loss of consecutive data packets) during transmission leads to a loss of consecutive data units of the data stream, which can be particularly detrimental to the quality of the received data at the receiver 108.

However, when interleaving is applied then the order of transmission of the data packets is not in consecutive order of the data units. For example, FIG. 7 shows the data packets being transmitted in the order {1, 3, 5, 2, 4, 6}. In this case, a loss burst (a loss of consecutive data packets) during transmission may lead to a loss of non-consecutive data units of the data stream, which may not be so detrimental to the quality of the received data at the receiver 108. For example, neighbouring data units in the data stream may be correctly received at the receiver which can be used for concealment of a lost data unit.

While interleaving reduces the impact of data packet loss during transmission, it comes at a price of delay. Refraining from sequential transmission of data units means that earlier data units will be transmitted only after later data units in the data stream are generated and transmitted. In the example above, data unit 2 is transmitted only after data units 3 and 5 are generated and transmitted. Therefore, data unit 2 will not be available at the receiver 108 immediately after data unit 1. In order to facilitate continuous playback of the data stream at the receiver 108, data unit 1 can be played slower until data unit 2 is received, or data unit 1 can be played at normal speed but with a delayed start, or using a combination thereof. In all cases, interleaving requires a delay in playback at the receiver 108, which is referred to as an "interleaving delay". The interleaving delay is shown in FIG. 7 as the time interval between the time at which data unit 2 would have been received at the receiver 108 if the data units were transmitted consecutively and the time at which data unit 2 is received due to the interleaving of the data packets.

However, the delay need not be necessarily introduced at the receiver 108 due to interleaving alone. As described above, the delay might already exist at the receiver due to the jitter buffer 114. If the receiver 108 can tolerate the interleaving delay of data unit 2, for example if data unit 2 is not required for decoding and/or playback at the receiver 108 until the data unit 2 is received at the receiver 108, then the interleaving delay does not become an additional delay/cost in the transmission of the data units. This can be the case due to jitter buffer delay at the receiver 108. For example, the jitter buffer 114 may have enough earlier data (preceding data unit 2 in the data stream) to provide for continuous decoding and/or playback before the data unit 2 arrives at the receiver 108. Therefore the state of the jitter buffer 114, in particular the current jitter buffer delay will affect the amount of interleaving delay that can be tolerated.

The jitter buffer state information received at the transmitter 102 from the receiver 108 in step S202 is used by an interleaving scheme implemented at the transmitter 102 to control the interleaving delay of the transmitted data. For example, the interleaving delay may be controlled such that it is maximized given the jitter buffer delay of the jitter buffer 114, without further increasing (or minimally increasing) the total delay of the data units of the transmitted data stream. Therefore the interleaving delay may be controlled such that it corresponds to the delay of the jitter buffer 114. This means that the interleaving delay may be controlled to equal (or approximately equal) the delay of the jitter buffer 114.

In another example, interleaving is used when forming data packets for transmission from the transmitter 102 to the receiver 108. A number of coded data units are placed into each data packet. Let us consider six consecutive data units 1, 2, 3, 4, 5, 6, and the case where three of the data units are packetized into a first data packet and the other three of the data units are packetized into a second data packet. If no interleaving is applied then the first data packet would include the first three data units {1, 2, 3} and the second data packet would include the next three data units {4, 5, 6}. In this case, a loss of a data packet during transmission leads to a loss of consecutive data units of the data stream, which can be particularly detrimental to the quality of the received data at the receiver 108.

However, when interleaving is implemented the first data packet may include the data units {1, 3, 5} and the second data packet may include the data units {2, 4, 6}. In this case, a loss of a data packet during transmission leads to a loss of non-consecutive data units of the data stream, which may not be so detrimental to the quality of the received data at the receiver 108. For example, neighbouring data units in the data stream may be correctly received at the receiver which can be used for concealment of a lost data unit.

In this example, the transmitter 102 introduces a delay that is a combination of the packetization and the interleaving delays. However, as described above, this combined delay may not be an additional delay, if it already exists at the receiver due to the delay of the jitter buffer 114. Therefore the interleaving delay and the packetization delay may be controlled together such that the combined delay (packetization delay+interleaving delay) corresponds to the delay of the jitter buffer 114 as indicated in the jitter buffer state information received at the transmitter 102 in step S202.

There are therefore described above methods for controlling the operation of processing modules of the transmitter 102 based on the state of the jitter buffer 114 of the receiver 108. The processing parameters may be jointly controlled. In this way, processing parameters which describe how the data is to be processed for transmission to the receiver 108 are controlled based on the state of the jitter buffer 114 such that the way in which the data is processed is optimized to suit the state of the jitter buffer 114.

In the embodiments described above the state of the jitter buffer 114 is a current state of the jitter buffer 114. In alternative embodiments the state of the jitter buffer which is indicated to the transmitter 102 may be a future state of the jitter buffer indicating a state that the jitter buffer is likely to have at some point in the future when data is to be transmitted from the transmitter 102 to the jitter buffer 114 of the receiver 108.

Figure 8:
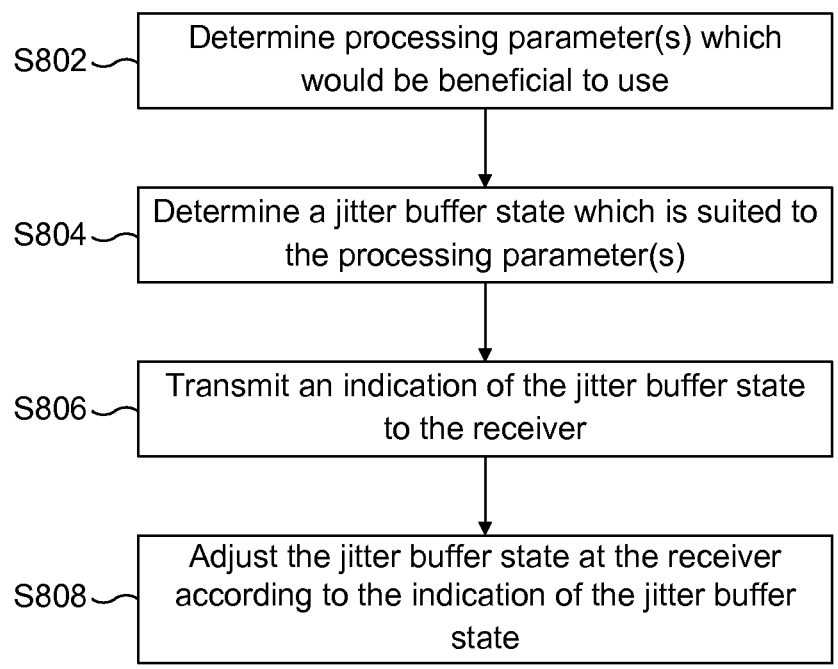
FIG. 8 is a flow chart for a process of adjusting a jitter buffer state of the receiver in accordance with one or more embodiments.

With reference to FIG. 8 there is now described another method of optimizing the relationship between the processing parameters used at the transmitter 102 and the state of the jitter buffer 114.

In step S802 processing parameters which would be beneficial for the transmitter 102 to use when processing data for transmission to the receiver 108 are determined. These processing parameters may be adjusted versions of the processing parameters which are determined based on the state of the jitter buffer 114 as described above. Alternatively, the processing parameters may be determined in step S802 without considering the state of the jitter buffer 114. As described above, the processing parameters may include one or more of the encoding bit rate, the FEC depth, a packetization delay and an interleaving delay.

In step S804 the processing parameters determined in step S802 are used to determine a state of the jitter buffer 114 which would be suited for receiving data which has been processed in accordance with the processing parameters determined in step S802. For example, if the encoding bit rate is increased then the available space in the jitter buffer 114 may need to be increased to accommodate the extra data that is to be transmitted due to the increase in the encoding bit rate. The jitter buffer size should be adapted in dependence on a change in the encoding bit rate of the data and in dependence on a bottleneck of the transmission path. If the available space in the jitter buffer is the bottleneck in the transmission path then the current size of the jitter buffer 114 should be reduced to allow more data to be received at the jitter buffer 114. Alternatively, if the communication channel is the bottleneck in the transmission path and the increase in bit rate results in an increase in propagation delay then the jitter buffer 114 has to make sure it has enough earlier data to ensure continuous playback while waiting for new data.

As another example, if the FEC depth that is used to generate FEC data units for data units of the data stream that is to be transmitted is increased then the delay of the jitter buffer 114 may need to be increased so that the FEC data units can be received at the jitter buffer 114 before they are needed in order to correct errors in the transmission of the data units. As another example, if one or both of the packetization delay and the interleaving delay is increased then the delay of the jitter buffer 114 may need to be increased correspondingly so that the data units are received at the jitter buffer 114 of the receiver 108 before they are required to be output from the jitter buffer 114. The jitter buffer state which is determined in step S804 is determined to optimize the operation of the jitter buffer 114 for receiving the data which is processed based on the processing parameters at the transmitter 102.

In step S806 an indication of the jitter buffer state determined in step S804 is transmitted from the transmitter 102 to the receiver 108. The jitter buffer state may be transmitted at the same time as the transmission of the data from the transmitter to the receiver 108 or the jitter buffer state may be transmitted before the transmission of the data from the transmitter to the receiver 108. The transmission of the indication of the jitter buffer state will require the transmission of a small number of bits from the transmitter 102 to the receiver 108, which may be transmitted in a separate data packet or be piggybacked to an existing data packet from the transmitter 102 to the receiver 108.

In step S808 the state of the jitter buffer 114 at the receiver 108 is adjusted based on the indication of the jitter buffer state which has been received from the transmitter 102. In this way the jitter buffer 114 is placed in a state which is suited (i.e. optimized) for receiving the data which is transmitted from the transmitter 102 to the jitter buffer 114 of the receiver 108. Therefore when the data is processed at the transmitter 102 (in accordance with the processing parameters, as described above) and transmitted to the jitter buffer 114 of the receiver 108 then the jitter buffer 114 is in a state suited to receiving that data.

As described above, a FEC scheme may send information about a desired increase in FEC depth, a packetization scheme may send information about a desired increase in packetization delay, and an interleaving scheme may send information about a desired increase in separation of consecutive data units. In these cases, to facilitate higher robustness against packet loss, the jitter buffer 114 should increase its size (i.e. its delay). In general, the transmitter 102 may transmit information about a desired increase or decrease of the jitter buffer size (delay) to the receiver 108.

Figure 9:
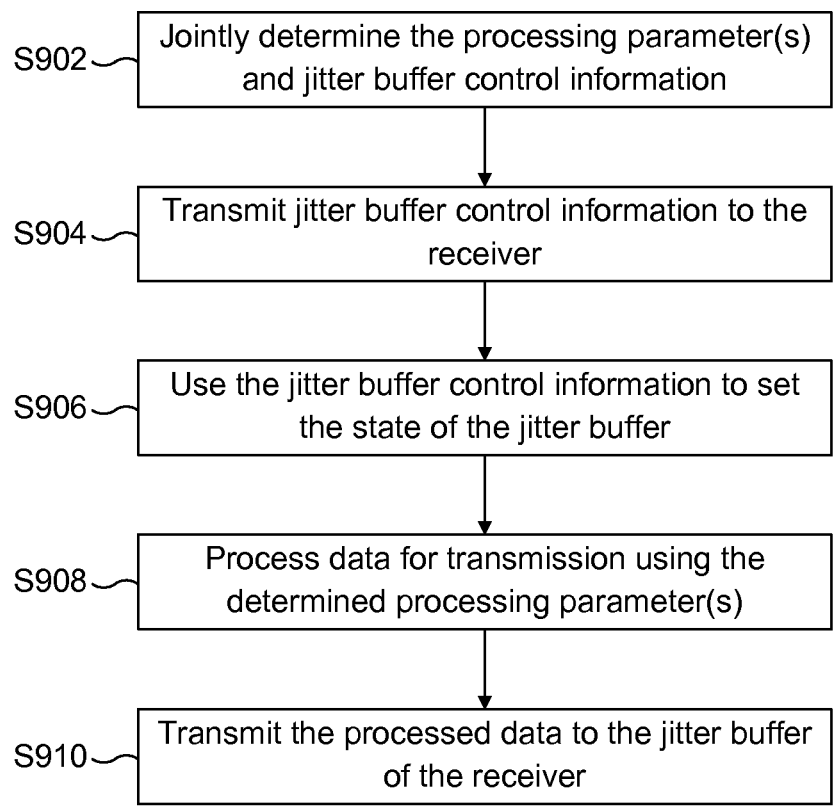
FIG. 9 is a flow chart for a second process of transmitting data from a transmitter to a receiver in accordance with one or more embodiments.

With reference to FIG. 9 there is now described another method of optimizing the relationship between the processing parameters used at the transmitter 102 and the state of the jitter buffer 114. In the method shown in FIG. 9 the processing parameters (used at the transmitter 102 to process the data for transmission to the receiver 108) and the state of the jitter buffer 114 of the receiver 108 are optimized jointly and adaptively. The parameters involved in the optimization (optimization measure) may include coding quality and bit rate, robustness against packet loss, and delay.

In step S902 the processing parameters used in the transmitter 102 to process data for transmission to the jitter buffer 114 of the receiver 108 are determined jointly with jitter buffer control information for controlling the state of the jitter buffer 114. The processing parameters and the jitter buffer control information are determined together such that they are suited (or "optimized") with respect to each other. Therefore the data which is processed according to the processing parameters is processed in such a way that is optimized to be received by the jitter buffer 114 which is operating in the jitter buffer state indicated by the jitter buffer control information. The joint determination of step S902 is performed at the transmitter 102.

In step S904 the jitter buffer control information is transmitted from the transmitter 102 to the receiver 108. The jitter buffer control information may be transmitted at the same time as the transmission of the data from the transmitter to the receiver 108 or the jitter buffer control information may be transmitted before the transmission of the data from the transmitter to the receiver 108. The transmission of the jitter buffer control information will require the transmission of a small number of bits from the transmitter 102 to the receiver 108, which may be transmitted in a separate data packet or be piggybacked to an existing data packet from the transmitter 102 to the receiver 108.

In step S906 the jitter buffer control information is used at the receiver 108 to set the state of the jitter buffer 114. For example the size or delay of the jitter buffer 114 may be set in accordance with the jitter buffer control information which has been determined jointly with the processing parameters in step S902.

In step S908 the data is processed at the transmitter 102 using the processing parameters which were determined in step S902.

In step S910 the processed data is transmitted from the transmitter 102 to the jitter buffer 114 of the receiver 108. As described above, the jitter buffer 114 will be in a state which is suited for receiving the data which has been processed according to the processing parameters determined in step S902.

In the method described above in relation to FIG. 9 the joint determination of the processing parameters and the jitter buffer control information is performed at the transmitter 102 and then the jitter buffer control information is transmitted from the transmitter 102 to the receiver 108 such that the state of the jitter buffer 114 can be set accordingly. However, in alternative embodiments the joint determination of the processing parameters and the jitter buffer control information is performed at the receiver 108 and then an indication of the jitter buffer state and/or an indication of the determined processing parameters are transmitted from the receiver 108 to the transmitter 102 so that the transmitter 102 can control the processing parameters accordingly.

In other embodiments, the joint determination of the processing parameters and the jitter buffer control information is performed at a control node (other than the transmitter 102 and the receiver 108) and the jitter buffer control information is transmitted from the control node to the receiver 108 so that the state of the jitter buffer 114 can be set accordingly and an indication of the determined processing parameters can be transmitted from the control node to the transmitter 102 so that the transmitter 102 can use the determined processing parameters to process the data for transmission to the receiver 108.

It may be advantageous to jointly determine the processing parameters and the state of the jitter buffer 114 such that the data processing at the transmitter 102 and the state of the jitter buffer 114 at the receiver 108 can be optimized with respect to each other.

One way of improving the operation of the communication system is for the transmitter 102 to send control information to the receiver 108 wherein the receiver 108 controls the state of the jitter buffer 114 based on the control information. This allows the transmitter 102 to determine the processing parameters with which it processes the data for transmission to the receiver 108, for example to improve the quality of the processed data. The state of the jitter buffer 114 is then determined based on the processing parameters. The state of the jitter buffer may be determined at the transmitter 102 and then the control information sent to the receiver 108 comprises an indication of the determined state of the jitter buffer 114. Alternatively, the control information that is transmitted from the transmitter 102 to the receiver 108 may include an indication of the processing parameter(s) used at the transmitter 102 to process the data of the real-time communication event for transmission to the receiver 108. In that case the receiver 108 determines the state of the jitter buffer 114 based on the indication of the processing parameters received from the transmitter 102.

Figure 10:
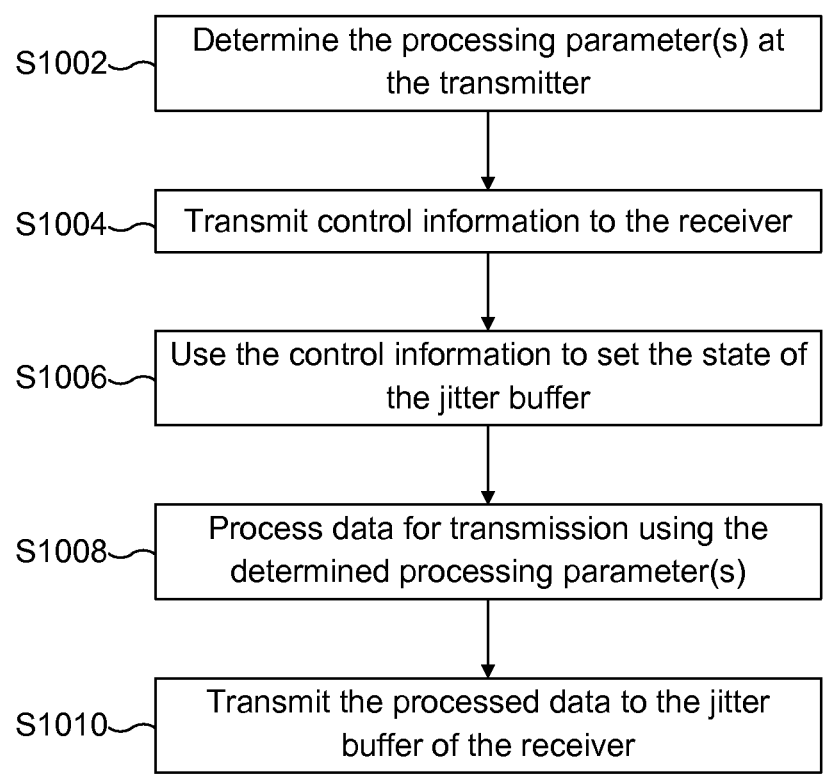
FIG. 10 is a flow chart for a third process of transmitting data from a transmitter to a receiver in accordance with one or more embodiments.

FIG. 10 is a flow chart for a process of transmitting data of a real-time communication event from the transmitter 102 to the receiver 108 in accordance with one or more embodiments. In step S1002 the processing parameters used in the transmitter 102 to process data for transmission to the jitter buffer 114 of the receiver 108 are determined. The processing parameters may be determined in such a way to improve the quality of the processed data.

In step S1004 control information is transmitted from the transmitter 102 to the receiver 108. As described above the control information may comprise an indication of a state of the jitter buffer 114 and/or an indication of the processing parameters determined in step S1002. The control information may be transmitted at the same time as the transmission of the data from the transmitter 102 to the receiver 108 or the control information may be transmitted before the transmission of the data from the transmitter 102 to the receiver 108. The transmission of the control information will require the transmission of a small number of bits from the transmitter 102 to the receiver 108, which may be transmitted in a separate data packet or be piggybacked to an existing data packet from the transmitter 102 to the receiver 108.

In step S1006 the control information is used at the receiver 108 to set the state of the jitter buffer 114. For example the size or delay of the jitter buffer 114 may be set in accordance with the control information.

In step S1008 the data of the real-time communication event is processed at the transmitter 102 using the processing parameters which were determined in step S1002.

In step S1010 the processed data is transmitted from the transmitter 102 to the jitter buffer 114 of the receiver 108. As described above, the jitter buffer 114 will be in a state which is suited for receiving the data which has been processed according to the processing parameters determined in step S1002.

For example, the transmitter 102 may decide the best values of the processing parameters based solely on performance of a corresponding processing module (e.g. a combination of transmitter and receiver parts of the processing module), rather than jointly optimizing the processing parameters with the state of the jitter buffer 114. For example, when determining processing parameters for a FEC scheme at the transmitter 102, the FEC encoder at the transmitter 102 might decide to increase the FEC depth to improve the ability of the data stream to recover from packet losses during transmission. The FEC decoder at the receiver 108 will correspondingly increase its delay. If the delay of the jitter buffer 114 is lower than that corresponding to the new FEC depth then there may be a problem in the playout of the data at the receiver 108. In prior art systems, the new delay at FEC decoder will be seen by jitter buffer as increased delay/jitter. The jitter buffer would then adapt its delay accordingly, but this adaptation might happen too late or too quickly, and the quality of the signal played out at the receiver 108 may consequently suffer. However, in contrast, according to the methods described above, the FEC encoder at the transmitter 102 notifies the jitter buffer 114 in advance of the change in FEC depth, then the jitter buffer 114 has time to prepare for the change in FEC delay. In this case, the jitter buffer 114 will prepare for the increase in delay and will play its content slower while waiting for further data packets to arrive. This will improve the quality of the signal played out at the receiver 108.

The method steps described above (and in particular the method steps shown in FIGS. 2, 8, 9 and 10) shown may be implemented in hardware or software at the transmitter 102 and the receiver 108. For example, where the method steps are performed in software they may be implemented by executing instructions from a computer program product on processors of the transmitter 102 and the receiver 108. The computer program product may be embodied on a non-transient computer-readable medium and configured for execution on the processors of the transmitter 102 or the receiver 108.

The at least one processing parameter may include any parameter which affects how the processed data is subsequently processed at the receiver in order to be played out at the receiver. For example, the at least one processing parameter may include at least one of: (i) an encoding bit rate with which the data is encoded during the processing of the data, (ii) a FEC depth, (iii) a packetization delay, and (iv) an interleaving delay.

The control information may indicate the determined at least one processing parameter, and the method may further comprise determining, at the receiver, the state of the jitter buffer based on the indicated at least one processing parameter. Alternatively, the method may further comprise determining, at the transmitter, the state of the jitter buffer based on the determined at least one processing parameter, wherein the control information may indicate the determined state of the jitter buffer. The at least one processing parameter and the state of the jitter buffer may be jointly determined at the transmitter.

The processing parameter may be determined to thereby control at least one quality parameter of the transmitted data. The at least one quality parameter of the transmitted data may comprise at least one of: (i) a coding quality, (ii) a bit rate, and (iii) a robustness against packet loss.

The step of processing data for transmission from the transmitter to the jitter buffer may comprise encoding the data, wherein the at least one processing parameter may comprise an encoding bit rate with which the data is encoded. The state of the jitter buffer may comprise the size of the jitter buffer or the available space in the jitter buffer, wherein the size of the jitter buffer or the available space in the jitter buffer may be determined based on the encoding bit rate.

The processed data may comprise a stream of data packets and the step of processing data for transmission from the transmitter to the jitter buffer may comprise generating correction data units relating to at least one of the data packets, wherein the at least one processing parameter may comprise a correction depth which sets the maximum allowable displacement in the stream of data packets between the oldest and the newest of the data packets that are allowed to be related to one of the correction data units. The state of the jitter buffer may comprise the delay of the jitter buffer, wherein the delay of the jitter buffer may be determined based on the correction depth. The correction data units may be Forward Error Correction data units and the correction depth may be a Forward Error Correction depth.

The data may comprise a stream of data units, and the step of processing data for transmission from the transmitter to the jitter buffer may comprise packetizing the data units into data packets for transmission, wherein the at least one processing parameter may comprise a packetization delay which sets the maximum allowable delay of the data units resulting from the packetization of the data units into data packets. The state of the jitter buffer may comprise the delay of the jitter buffer, wherein delay of the jitter buffer may be determined in dependence upon the packetization delay.

The step of processing data for transmission from the transmitter to the jitter buffer may comprise interleaving at least some of the data units for transmission, wherein the at least one processing parameter may comprise an interleaving delay which sets the maximum allowable delay of the data units resulting from the interleaving of the data units. The state of the jitter buffer may comprise the delay of the jitter buffer, wherein the delay of the jitter buffer may be determined in dependence upon the interleaving delay.

The jitter buffer state may include at least one of: (i) the size of the jitter buffer, (ii) the delay of the jitter buffer, and (iii) the available space in the jitter buffer. The jitter buffer state may be either a current state of the jitter buffer or a future state of the jitter buffer.

There may be provided a communication system for transmitting data in a real-time communication event from a transmitter as described herein to a receiver as described herein.

Features of the different embodiments described above may be combined in any suitable way as will be apparent to a person skilled in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
one or more processors; and
a computer-readable storage memory device comprising instructions executable by the one or more processors to perform operations to transmit data of a real-time communication event from a transmitter to a jitter buffer of a receiver, the operations comprising:
determining at least one processing parameter describing how the data is to be processed for transmission from the transmitter to the jitter buffer in the real-time communication event;
processing the data for transmission as a stream of data units from the transmitter to the jitter buffer in accordance with the determined at least one processing parameter, the processing the data comprising interleaving at least some of the data units for transmission, the at least one processing parameter comprising an interleaving delay which sets the maximum allowable delay of the data units resulting from the interleaving of the data units;
transmitting, to the receiver, control information based on the determined at least one processing parameter, the control information being effective to enable the receiver to control a state of the jitter buffer; and
transmitting the processed data to the jitter buffer of the receiver in the real-time communication event.

2. The system of claim 1 wherein either:
the control information indicates the determined at least one processing parameter, effective to enable the receiver to determine the state of the jitter buffer based on the indicated at least one processing parameter; or
the instructions are further executable to perform the operation of determining the state of the jitter buffer based on the determined at least one processing parameter, wherein the control information indicates the determined state of the jitter buffer.

3. The system of claim 2 wherein the at least one processing parameter and the state of the jitter buffer are jointly determined at the transmitter.

4. The system of claim 2 wherein the at least one processing parameter and the state of the jitter buffer are jointly determined at an external control node.

5. The system of claim 1 wherein the determined at least one processing parameter is usable to control at least one quality parameter of the transmitted data, wherein the at least one quality parameter of the transmitted data comprises at least one of: a coding quality, a bit rate, or a robustness against packet loss.

6. The system of claim 1 wherein the at least one processing parameter comprises an encoding bit rate, and wherein the processing data for transmission from the transmitter to the jitter buffer further comprises encoding the data using the encoding bit rate.

7. The system of claim 6 wherein the state of the jitter buffer comprises a size of the jitter buffer or an available space in the jitter buffer, wherein the size of the jitter buffer or the available space in the jitter buffer is determined based on the encoding bit rate.

8. The system of claim 1 wherein said processed data comprises a stream of data packets and wherein said processing data for transmission from the transmitter to the jitter buffer comprises generating correction data units relating to at least one of the data packets, and wherein the at least one processing parameter comprises a correction depth which sets the maximum allowable displacement in the stream of data packets between the oldest and the newest of the data packets that are allowed to be related to one of the correction data units.

9. The system of claim 8 wherein the state of the jitter buffer comprises a delay of the jitter buffer, wherein the delay of the jitter buffer is determined based on the correction depth.

10. The system of claim 1 wherein the data further comprises a stream of data units, wherein the at least one processing parameter comprises a packetization delay which sets a maximum allowable delay of the data units during packetization, and wherein the processing the data for transmission from the transmitter to the jitter buffer further comprises packetizing the data units, using the packetization delay, into the data packets for transmission.

11. The system of claim 10 wherein the state of the jitter buffer comprises a delay of the jitter buffer, and wherein the delay of the jitter buffer is determined based on the packetization delay.

12. The system of claim 1 wherein the state of the jitter buffer comprises a delay of the jitter buffer, and wherein the delay of the jitter buffer is determined based on the interleaving delay.

13. The system of claim 1 wherein the jitter buffer state is either a current state of the jitter buffer or a future state of the jitter buffer.

14. A transmitter for transmitting data of a real-time communication event to a jitter buffer of a receiver, the transmitter comprising a processor configured to:
determine at least one processing parameter describing how the data is to be processed for transmission from the transmitter to the jitter buffer in the real-time communication event;
process data for transmission as a stream of data units from the transmitter to the jitter buffer in accordance with the determined at least one processing parameter, including interleaving at least some of the data units for transmission, the at least one processing parameter comprising an interleaving delay which sets the maximum allowable delay of the data units resulting from the interleaving of the data units;
transmit to the receiver, control information based on the determined at least one processing parameter, the control information being effective to enable the receiver to control a state of the jitter buffer; and
transmit the processed data to the jitter buffer of the receiver in the real-time communication event.

15. The transmitter of claim 14, wherein the state of the jitter buffer comprises a delay of the jitter buffer, and wherein the delay of the jitter buffer is determined based on the interleaving delay.

16. A computer-readable storage memory device comprising instructions executable by one or more processors to perform operations to receive, at a jitter buffer of a receiver from a transmitter, data of a real-time communication event, the operations comprising:
- receiving, from the transmitter, control information based on at least one processing parameter, the at least one processing parameter being used at the transmitter to process the data a stream of data units, including interleaving at least some of the data units for transmission, the at least one processing parameter comprising an interleaving delay which sets the maximum allowable delay of the data units resulting from the interleaving of the data units;
- controlling a state of the jitter buffer based on the received control information; and
- receiving the data of the real-time communication event, from the transmitter, at the jitter buffer of the receiver.

17. The computer-readable storage memory device of claim 16 wherein either:
- the received control information indicates the at least one processing parameter, and the instructions being executable to determine the state of the jitter buffer based on the indicated at least one processing parameter; or
- the state of the jitter buffer is determined at the transmitter based on the at least one processing parameter, and the received control information indicates the determined state of the jitter buffer.

18. The computer-readable storage memory device of claim 16 wherein the at least one processing parameter comprises an encoding bit rate, wherein the processing of the data for transmission at the transmitter further comprises encoding the data using the encoding bit rate, and wherein the state of the jitter buffer comprises a size of the jitter buffer or an available space in the jitter buffer, the instructions further executable to determine the size of the jitter buffer or the available space in the jitter buffer based on the encoding bit rate.

19. The computer-readable storage memory device of claim 16 wherein the state of the jitter buffer comprises a delay of the jitter buffer, the instructions further executable to determine the delay of the jitter buffer based on the correction depth.

20. The computer-readable storage memory device of claim 16 wherein the data further comprises a stream of data units, wherein the at least one processing parameter comprises a packetization delay which sets a maximum allowable delay of the data units during packetization, wherein the processing of the data for transmission at the transmitter further comprises packetizing the data units, using the packetization delay, into the data packets for transmission, and wherein the state of the jitter buffer comprises a delay of the jitter buffer, the instructions further executable to determine the delay of the jitter buffer based on the packetization delay.

* * * * *